US012621157B2

(12) United States Patent
Aichinger

(10) Patent No.: US 12,621,157 B2
(45) Date of Patent: *May 5, 2026

(54) AUTHENTICATION OF COMMUNICATION SESSION PARTICIPANTS USING BLOCKCHAIN

(71) Applicant: Microsoft Technology Licensing, LLC, Redmond, WA (US)

(72) Inventor: Michal Aichinger, Prague (CZ)

(73) Assignee: Microsoft Technology Licensing, LLC, Redmond, WA (US)

( * ) Notice: Subject to any disclaimer, the term of this patent is extended or adjusted under 35 U.S.C. 154(b) by 44 days.

This patent is subject to a terminal disclaimer.

(21) Appl. No.: 18/902,627

(22) Filed: Sep. 30, 2024

(65) Prior Publication Data

US 2025/0030550 A1 Jan. 23, 2025

Related U.S. Application Data

(63) Continuation of application No. 18/373,742, filed on Sep. 27, 2023, now Pat. No. 12,143,493, which is a continuation of application No. 17/462,954, filed on Aug. 31, 2021, now Pat. No. 11,811,930.

(51) Int. Cl.

| | |
|---|---|
| *H04L 9/32* | (2006.01) |
| *H04L 9/00* | (2022.01) |
| *H04L 9/08* | (2006.01) |
| *H04L 9/40* | (2022.01) |
| *H04L 67/141* | (2022.01) |
| *H04L 67/146* | (2022.01) |

(52) U.S. Cl.
CPC .......... *H04L 9/3213* (2013.01); *H04L 9/0825* (2013.01); *H04L 67/141* (2013.01); *H04L 67/146* (2013.01); *H04L 9/50* (2022.05)

(58) Field of Classification Search
CPC ... H04L 9/3213; H04L 9/0825; H04L 67/141; H04L 67/146; H04L 9/50; H04L 63/0807
See application file for complete search history.

(56) References Cited

U.S. PATENT DOCUMENTS

| | | | | |
|---|---|---|---|---|
| 2017/0088397 | A1* | 3/2017 | Buckman | .............. B66B 1/3461 |
| 2022/0368521 | A1* | 11/2022 | Stokes | ................. H04L 9/0825 |
| 2024/0314562 | A1* | 9/2024 | Suzuki | .................... G06F 21/33 |

* cited by examiner

*Primary Examiner* — Darren B Schwartz
(74) *Attorney, Agent, or Firm* — Schwegman Lundberg & Woessner, P.A.

(57) ABSTRACT

Disclosed in some examples are methods, systems, devices, and machine-readable mediums which utilize authentication tokens recorded to a blockchain to identify and/or authenticate participants of a network-based communication session such as a network-based meeting. When joining the meeting, the participant may provide a token recorded on a blockchain to the communication service from the blockchain. The communication service may then identify and/or authenticate the user based upon the provided token. Various user-specific customizations and settings may then be applied and the user may be admitted to the meeting without having to enter a waiting room and be explicitly let in.

20 Claims, 7 Drawing Sheets

100

130

SCHEDULING DEVICE

140

BLOCKCHAIN
AUTHENTICATED
DEVICE

152

IDENTITY SERVER
AUTHENTICATED
DEVICE

120

IDENTITY
SERVICE

160

NETWORK (E.G., INTERNET)

110

COMMUNICATION
SERVICE

150

BLOCKCHAIN
NETWORK

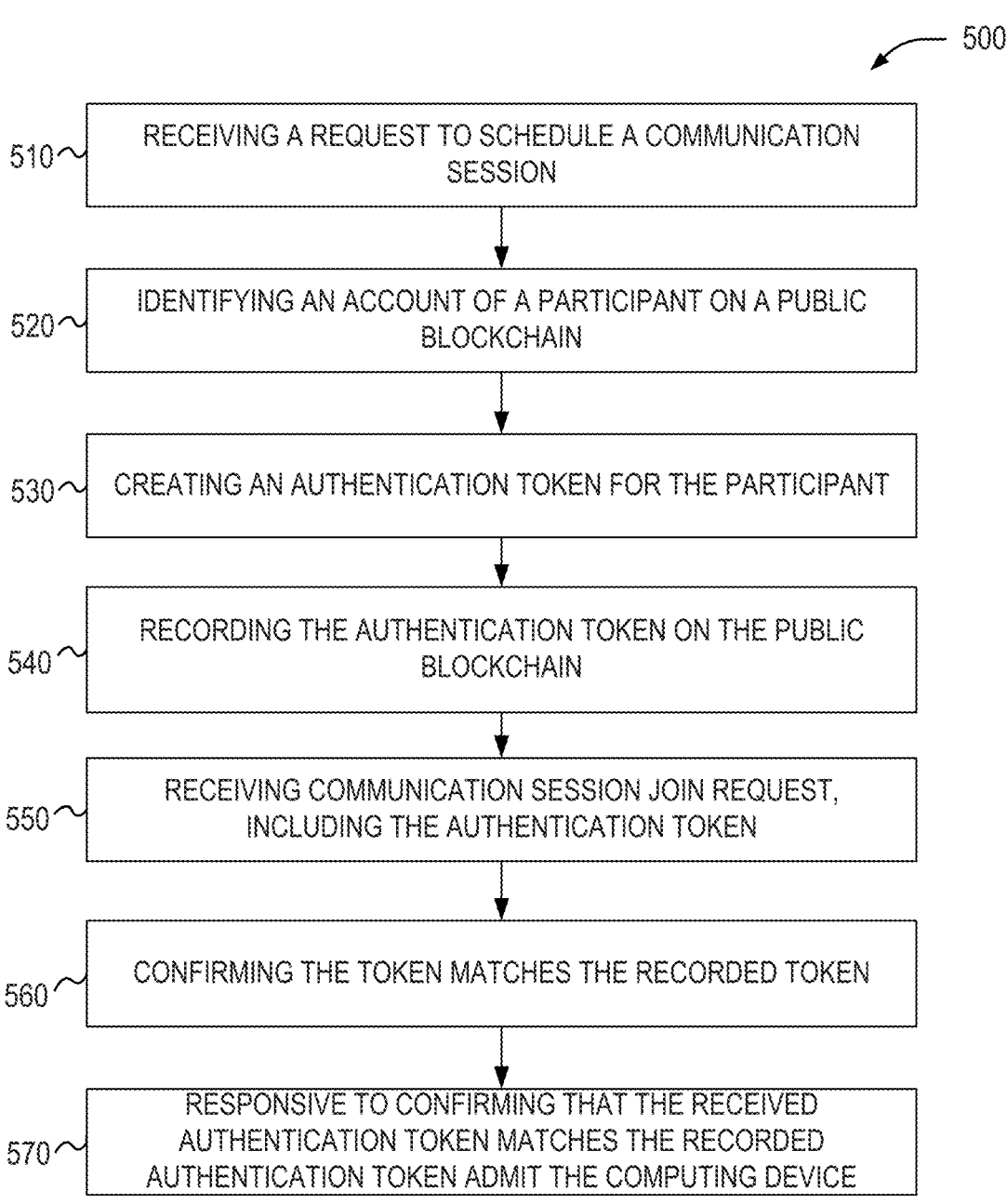

500

510 — RECEIVING A REQUEST TO SCHEDULE A COMMUNICATION SESSION

520 — IDENTIFYING AN ACCOUNT OF A PARTICIPANT ON A PUBLIC BLOCKCHAIN

530 — CREATING AN AUTHENTICATION TOKEN FOR THE PARTICIPANT

540 — RECORDING THE AUTHENTICATION TOKEN ON THE PUBLIC BLOCKCHAIN

550 — RECEIVING COMMUNICATION SESSION JOIN REQUEST, INCLUDING THE AUTHENTICATION TOKEN

560 — CONFIRMING THE TOKEN MATCHES THE RECORDED TOKEN

570 — RESPONSIVE TO CONFIRMING THAT THE RECEIVED AUTHENTICATION TOKEN MATCHES THE RECORDED AUTHENTICATION TOKEN ADMIT THE COMPUTING DEVICE

610 — RECEIVING A COMMUNICATION SESSION INVITATION

620 — IDENTIFYING AN AUTHENTICATION TOKEN RECORDED IN A BLOCKCHAIN

630 — RECEIVING AN INDICATION TO JOIN THE COMMUNICATION SESSION

640 — RETRIEVING THE TOKEN

650 — SENDING A JOIN REQUEST TO A COMMUNICATION SERVICE TO JOIN THE SESSION, THE JOIN REQUEST INCLUDING THE TOKEN

660 — PARTICIPATING IN THE COMMUNICATION SESSION

AUTHENTICATION OF COMMUNICATION SESSION PARTICIPANTS USING BLOCKCHAIN

CROSS-REFERENCE TO RELATED APPLICATIONS

This application is a continuation of prior application Ser. No. 18/373,742, filed on Sep. 27, 2023, which application is a continuation of prior application Ser. No. 17/462,954, filed on Aug. 31, 2021, which applications are incorporated by reference herein in their entirety.

TECHNICAL FIELD

Embodiments pertain to network-based communication sessions. Some embodiments relate to authentication of users of network-based communication sessions.

BACKGROUND

Network-based communication sessions, such as VOIP phone calls, network-based meetings, and the like may allow users to share voice, video, documents, and other communications in a very natural way that accurately simulates person-to-person interactions despite the participants not being in physical proximity to each other. For example, network-based meetings may simulate an in-person meeting that enables participants to see, hear, and interact with one another and with one or more documents.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 5 illustrates a flowchart of a method of using a blockchain token to authenticate users of a communication session according to some examples of the present disclosure.

DETAILED DESCRIPTION

Figure 1:
FIG. 1 illustrates a system according to some examples of the present disclosure.

Network-based communication sessions, such as online meetings, are scheduled by a user at a scheduling computing device. Typically, to schedule the session, a user interacts with a Graphical User Interface (GUI) provided by a communication service that provides the network-based communication session or interacts with a GUI provided by another application such as a calendar or email application. As part of scheduling the network-based communication session, the scheduling user provides identifiers for one or more participants. Identifiers may include usernames, email addresses, or the like.

For participants with identifiers that link to accounts in a local tenant or a federated tenant that is trusted by the communication system, the system may be able to verify the identity of those participants, both during the scheduling process and when signing in when those participants as these participants are authenticated with that tenant prior to joining the communication session.

In some cases, a scheduling user may invite participants from outside the tenant or a federated tenant by providing an email address with a domain that is outside of the tenant or federated tenant(s). While the invitation sent to the provided email address may include join information that may be specific to that user (e.g., a meeting identifier and a password), there is no way to verify that a person joining with the join information provided to that email address is that individual rather than someone that the user forwarded the meeting join information to.

As a result, in many cases security policies prevent the organizer from setting custom settings for the communication sessions for these attendees. In addition, these outside participants may have to join via a secured join path that first places these users in a meeting lobby until they are approved. This provides a sub-optimal experience and wastes time and computing resources as meeting participants need to manually configure their communication experience during the start of the meeting. This wastes computing and network resources, time, and contributes to frustration.

Disclosed in some examples are methods, systems, devices, and machine-readable mediums which utilize authentication tokens recorded to a blockchain to identify and/or authenticate participants of a network-based communication session such as a network-based meeting. When creating a communication session, a token may be created for a participant. The token may be transferred to a blockchain account of the participant using a blockchain transaction. The blockchain account may be an existing account, or the blockchain account may be created for the participant by the communication service. When joining the meeting, the participant may provide the token to the communication service from the blockchain. For example, a blockchain wallet may provide the token to a communication application that may then forward the token to the communication service. The communication service may then identify and/or authenticate the user based upon the provided token. Various user-specific customizations and settings may then be applied and the user may be admitted to the meeting without having to enter a waiting room and be explicitly let in. In some examples, a token is created for all participants. In other examples, only participants that are not known to an identity service as being part of a trusted tenant.

In some examples, the token may be a non-fungible token (NFT) that is unique but is not copyable. While the token may be transferred, it is tied to a particular identified account on the blockchain. In some examples, the token may be made non-transferrable and may only be associated with the blockchain account specified by the organizer. In some examples, the token may be stored as a smart contract and the token may be sent to the user's wallet using the smart contract instructions. In other examples, the token may be sent to the participant using the communication service.

By tying the authentication information necessary to join a session to a token on a blockchain, the system may authenticate the user joining the session. This allows the system to apply user-specific communication session settings for that user as well as avoid placing users in a session lobby. While transfers of the authentication token on the blockchain may happen, these transactions are visible on the blockchain and the communication service may identify these transfers. In some examples, the scheduling user or a security policy of an organization or tenant may specify whether transfers are allowed or not. If transfers are not allowed, the communication service may deny access if a user presents a token that had been transferred. Similarly, by storing the token on the blockchain, the token may be controlled by a key of the user.

The present invention thus solves the technical problem of authenticating meeting participants that are not within a tenant with a technical solution of using a blockchain token. The providence of the blockchain token may be proven and may be tied to a particular blockchain account. This solves technical problems of configuration of communication sessions for untrusted participants by the technical solution of automated settings based upon the authentication. Past solutions configured these settings upon the user joining the meeting. For example, an administrator or other user may configure these settings after the participant has joined and been admitted from a lobby. By authenticating users using a token on a blockchain account, the system may have confidence that the invitee is the participant and the system may apply these settings immediately. This saves time, network bandwidth, and processor resources that would otherwise be used configuring these settings upon meeting join. The disclosed techniques thus improve the functioning of the communication system by providing more efficient and faster configuration of communication sessions.

FIG. 1 illustrates a system 100 according to some examples of the present disclosure. Network 160 may connect one or more components of the system 100. Network 160 may be a packet-switched, circuit-switched, or a combination packet-based and circuit-switched network. The network 160 may be a public and/or private network. In some examples, the network 160 may be or include portions of the Internet. Communication service 110 may provide one or more communication sessions as well as provide for scheduling communication sessions. For example, communication service 110 may be a Microsoft TEAMS® server. Communication service 110 may provide for the transfer of audio, video, and other communications during a communication session.

Identity service 120 may provide authentication and authorization for one or more users on one or more networks, platforms, or services. For example, the identity service 120 may be an Azure Active Directory® service. Scheduling device 130, blockchain authenticated device 140, and identity server authenticated device 152 may be computing devices such as desktops, laptops, tablets, mobile phones, and the like. Blockchain network 150 may be a network of computing devices (e.g., a peer-to-peer network) that stores and manages a blockchain. The blockchain is a list of records, called blocks, that are cryptographically linked. In some examples, the Blockchain network 150 is an Ethereum® Network. The blockchain network 150 may store blocks, calculate new blocks, process transactions, and the like.

Scheduling device 130 may schedule a communication session, such as a network-based meeting, using the communication service 110. Scheduling device 130 may also participate in the communication session. Scheduling device 130 may specify one or more communication session parameters. Communication session parameters may include any information about and/or setting of the communication session and may include in-session parameters, scheduling parameters, participant parameters, access parameters, resource parameters, and the like. In-session parameters may refer to one or more settings that may describe and configure the communication session when it is ongoing, such as audio parameters, video parameters, participant role parameters, and the like. Scheduling parameters may include the time, date, and the like. Participant parameters may include the list of participants and their information. Access parameters may include authentication information needed to enter the communication session or otherwise secure the communication session. Resource parameters may include the allocation of one or more communication service resources for providing the communication session. Some of the parameters may be set by the scheduling user of the scheduling device 130. For example, a time, a date, a list of participant identifiers, sharing parameters of the session, roles for each of the participants, and the like. Other parameters may be determined (e.g., automatically) by the communication service 110.

Upon scheduling a communication session, the communication service 110 may instantiate a communication session data structure that stores the session parameters (including the participant list). In addition, the communication service 110 may reserve one or more resources necessary for the communication session. For example, communication service 110 may reserve one or more media servers for the time of the communication session. In addition, communication service 110 may determine, for each participant, whether they are registered with an identity service 120 for a tenant associated with the scheduling device 130. A tenant is a group of users of a service that are distinct from other users and who may share resources. Users in the group of users may be considered trusted relative to each other as opposed to users outside the tenant. In some examples, one tenant may have a relationship with one or more other tenants that establishes a trust between those users. The communication service 110 may identify whether users invited to the meeting are part of an organization's tenant or a trusted tenant. In some examples, the communication service 110 may consult the identity service 120 to determine whether the user identifier is associated with a tenant of the organizer and/or a trusted tenant of the tenant of the organizer. In other examples, the communication service 110 may use the domain name of an email address of the invited participant to determine whether they are trusted or not. For example, if the tenant is example.com, and the participant is bridget@example.com, then the communication service 110 may identify this participant as a trusted participant, whereas a bridget@outlook.com may not be considered a trusted participant unless "outlook.com" was considered a trusted tenant of "example.com".

For those participants who are not authenticated with a trusted tenant, the communication service 110 may create an authentication token for those participants. In some examples, this may be an NFT. In some examples, this token may be a smart contract. The communication service 110 may identify an account associated with the participant on the blockchain network 150. This token may then be recorded as a transaction on the blockchain using the blockchain network 150 whereas the token is transferred to the identified account. For example, the blockchain may be an Ethereum blockchain and the account may be an account of the Ethereum blockchain. In some examples, the account of the blockchain network 150 may be identified based upon a correspondence between the email address or other participant identifier provided by the scheduling device 130 and an account on the blockchain. For example, if the participant is "bridget@outlook.com" and the system identifies that there is an account on the blockchain network that is "bridget@outlook.com" or has that as an email contact, the system may use that blockchain account. In other examples, one or more databases may be consulted to map the identifier provided by the scheduling device 130 to a blockchain account. For example, the participant may have registered the blockchain account on blockchain network 150 with the communication service 110 previously (e.g., from a previous communication session). In other examples, the communication service 110 may prompt the participant to provide the blockchain account on the blockchain network 150. In still other examples, the communication service 110 may create a blockchain account-either in response to not finding an account on the blockchain network 150 for the participant, or as part of every new meeting, a new account may be created. The communication service 110 may create, and then send to the participant a cryptographic key securing the account to the user.

The created token may be associated on the blockchain with an identifier of the particular meeting. For example, part of the token may be a session identifier. The token may also include an identifier of the participant (e.g., the identifier provided by the scheduling user), an identifier of the account of the participant on the blockchain network, one or more custom communication settings (such as roles of a participant), an indication of whether a transfer is allowed, and the like. In some examples, storing the session identifier may allow the communication service to quickly locate all authentication tokens for a given session by keying on the session identifier.

In some examples, the communication service 110 may, in addition to recording the token on the blockchain, store the token in a session data structure. An invitation may then be sent to all the participants (trusted or not). In some examples, for the participants that are not on a trusted domain, a notification of the transaction transferring the token may be sent to the devices of those participants. In some examples, this notification may trigger one or more applications, such as a communication application to request that a mobile wallet application retrieve the token from the blockchain. In some examples, the notification may be done automatically by smart contract code of a blockchain on the blockchain network 150 (e.g., the token may be recorded as a smart contract). In other examples, the notification may be done by the communication service 110 (e.g., using the invite message). In other examples, a wallet application of the recipient device may detect a transaction associated with the account and read the token directly from the blockchain network 150. For participants who are authenticated using the blockchain token, admission to the meeting and roles during the meeting (and other communication session parameters corresponding to users) may be associated with the tokens rather than the identifiers (e.g., email addresses) provided by the scheduling user. That is, the system may use the account on the blockchain, or an identifier of the token to reference the participant when admitting a user.

As noted, in some examples, untrusted participants who are not associated with a tenant or a trusted tenant may be authenticated with tokens recorded on a blockchain and participants who are associated with a tenant or a trusted tenant may be authenticated via the identity service. In other examples, all participants may be authenticated with, and have tokens transferred to, blockchain network accounts regardless of whether the participants are trusted by an identity service 120 by being part of a tenant or a trusted tenant.

As mentioned above the system may create a communication session data structure that stores settings of the communication session. In some examples, this data structure may be also recorded on the blockchain. When the communication service needs to retrieve this session data structure, the communication service may read it from the blockchain network.

During a meeting join process, an identity server authenticated device 152 may have a user that supplies credentials to an identity service 120 that logs them into a tenant or a trusted tenant of the scheduling device 130. The user may then login to the meeting and the communication service 110 may identify that they are logged in and then confirm that they are authorized to join the communication session. The identity server authenticated device 152 may be assigned to the roles and permission settings that were setup for that user by the scheduling user of the scheduling device 130. Note that the scheduling device 130 may also be a meeting participant.

Blockchain authenticated device 140 may join the communication session by passing the token recorded on the blockchain by the communication service 110 (via the blockchain network 150) to the communication service 110. For example, a communication application executing on the blockchain authenticated device 140 may obtain the token from a wallet application on the blockchain authenticated device 140 which may obtain the token from the blockchain. In some examples, the communication application on the blockchain authenticated device 140 may include blockchain functionality to serve as a mobile wallet for communication session-related tokens. The token may be sent to the communication service 110 by the communication application as part of a join process. The communication service may compare the token received with the token for the participant and the meeting to determine if the tokens match. The token to use in the comparison may be stored in the communication session data structure (e.g., as stored in a database of the communication session) or stored on the blockchain that is associated with the participant's account on the blockchain network 150. If the tokens do not match, the blockchain authenticated device 140 may be denied entry. If the tokens do match, the blockchain authenticated device 140 may be allowed entry to the meeting and roles, settings, and other parameters specified for the participant by the scheduling device 130 may be applied.

In some examples, the token recorded to the blockchain may include the identifier of the user, identifier of the account of the participant on the blockchain, identifier of the session, session information, configuration settings of the participant for the session, an indication of whether a transfer of the token is allowed, one or more random sequences, and the like.

In some examples, the token may be encrypted with the public key of the blockchain account, in other examples, the token may include a section encrypted with the public key of the blockchain account belonging to the user of the blockchain authenticated device 140 and a section encrypted by the communication service's public key. Each section may have same or different information. For example, each section may have the identifier of the user and the identifier of the meeting and/or a random number. When the blockchain authenticated device 140 sends the token, the communication service 110 may decrypt the portion of the token encrypted with its public key. If the information in the decrypted portion matches, the user may be admitted with the roles and settings specified by the scheduling device 130. In these later examples, the communication service 110 may not store a copy of the token or retrieve a copy from the blockchain network 150 as the communication service 110 can trust the token by virtue of successful verification using the communication service's key. In still other examples, the token may be signed by the communication service 110 and/or the blockchain authentication device 140. Such cryptographic signature may give an assurance to the communication service that the token is genuine.

Figure 2:
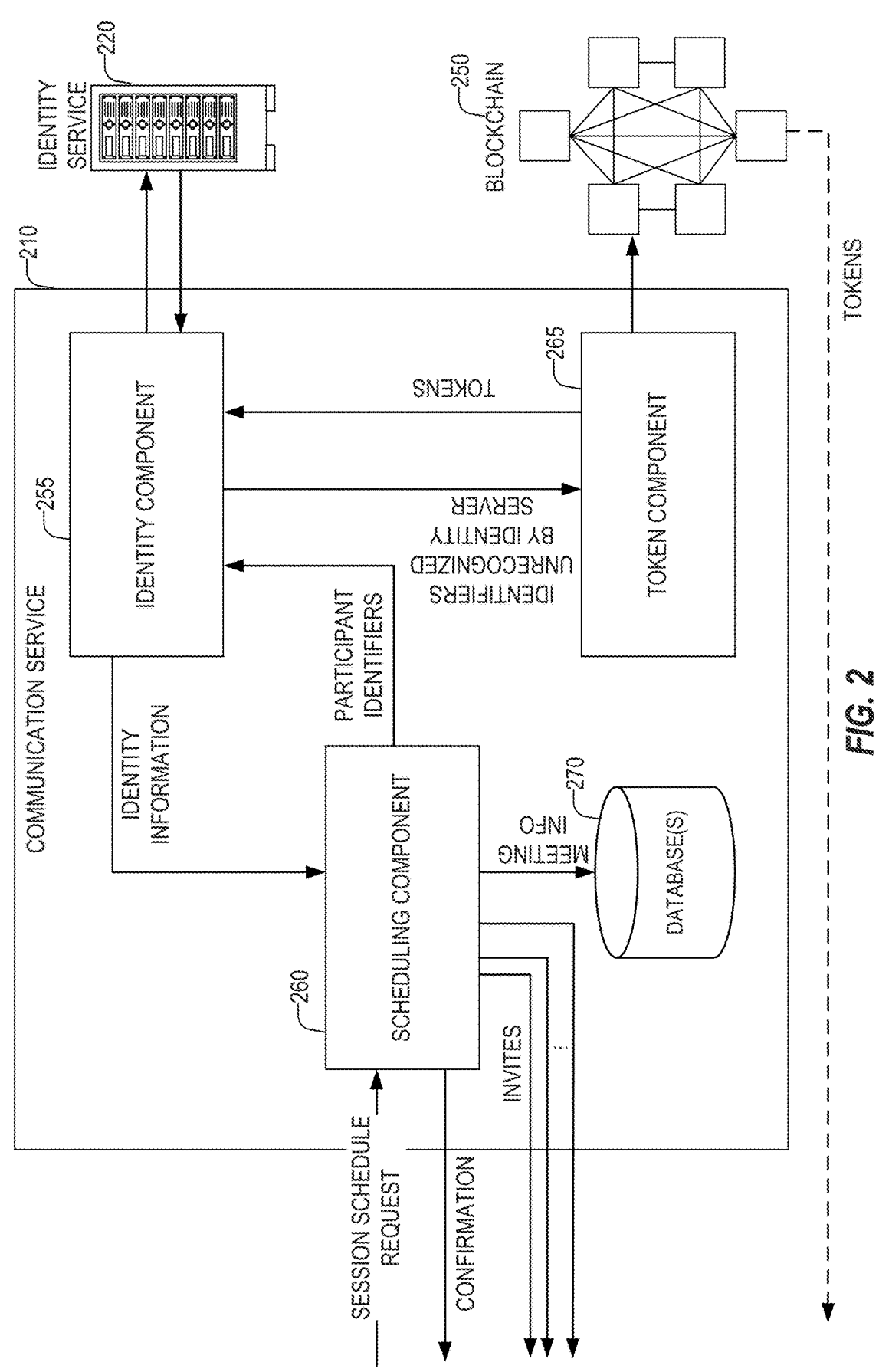
FIG. 2 illustrates communication scheduling components of a communication service according to some examples of the present disclosure.

FIG. 2 illustrates communication scheduling components of a communication service 210 according to some examples of the present disclosure. In some examples, communication service is an example of a communication service 110 of FIG. 1. One of ordinary skill in the art with the benefit of the present disclosure will appreciate that communication service 210 may include other components not shown in FIG. 2 such as components used to exchange media during one or more communication sessions, authenticate participants to a communication session, and the like.

A communication session schedule request is received by the scheduling component 260. The session scheduling request may include one or more communication session parameters selected by the scheduling user. Scheduling component 260 may create a communication session data structure, populate the communication session data structure with the communication session parameters, and store the data structure in the database 270. In addition to the information received from the scheduling request, the scheduling component 260 may reserve one or more resources for the communication session and may determine one or more other parameters that may also be stored in the communication session data structure.

Participant identifiers received with the communication session schedule request may be sent to the identity component 255. Identity component 255 may contact identity service 220 (which may be an example of identity service 120 of FIG. 1) to determine which of the participants is associated with the tenant or is associated with a trusted tenant of the tenant of the meeting scheduling user. For those participants that are associated with the tenant or trusted tenant, identity information may be passed to the scheduling component 260 indicating that the participant is associated with the tenant or trusted tenant.

For those participants that are not associated with a tenant or trusted tenant, the identity component 255 provides identifying information to the token component 265. Token component 265 may identify or determine one or more accounts for those participants on the blockchain network 250. In some examples, the system may create accounts for those participants on the blockchain network 250.

Token component generates an authentication token and transfers it to the participant's account on the blockchain network 250. In some examples, blockchain network 250 may be an example of blockchain network 150 of FIG. 1. Tokens created may be passed back to the identity component 255. Identity component 255 may provide this token to the scheduling component 260 which may record these tokens as part of the communication session data structure in the database 270. Scheduling component 260 may then record any custom communication session parameters for the meeting in general or for one or more users (whether identified by the identity service 220 or for which a token is created and recorded on blockchain network 250). In other examples, the custom session parameters may be recorded in the token created by token component 265.

Scheduling component 260 may then send a confirmation to the scheduling computing device and may send one or more invites to participants. Invites may include the tokens, communication session details, join information (e.g., a join link), and the like. The invites may be sent via email, text message, instant message, directly to a communication application, or the like.

In some examples, the communication session data structure may identify, and associate the token with one or more custom communication session parameters rather than the participant identifier. In some examples, rather than use a database 270, the system may record the communication session data structure on the blockchain using blockchain network 250.

Figure 3:
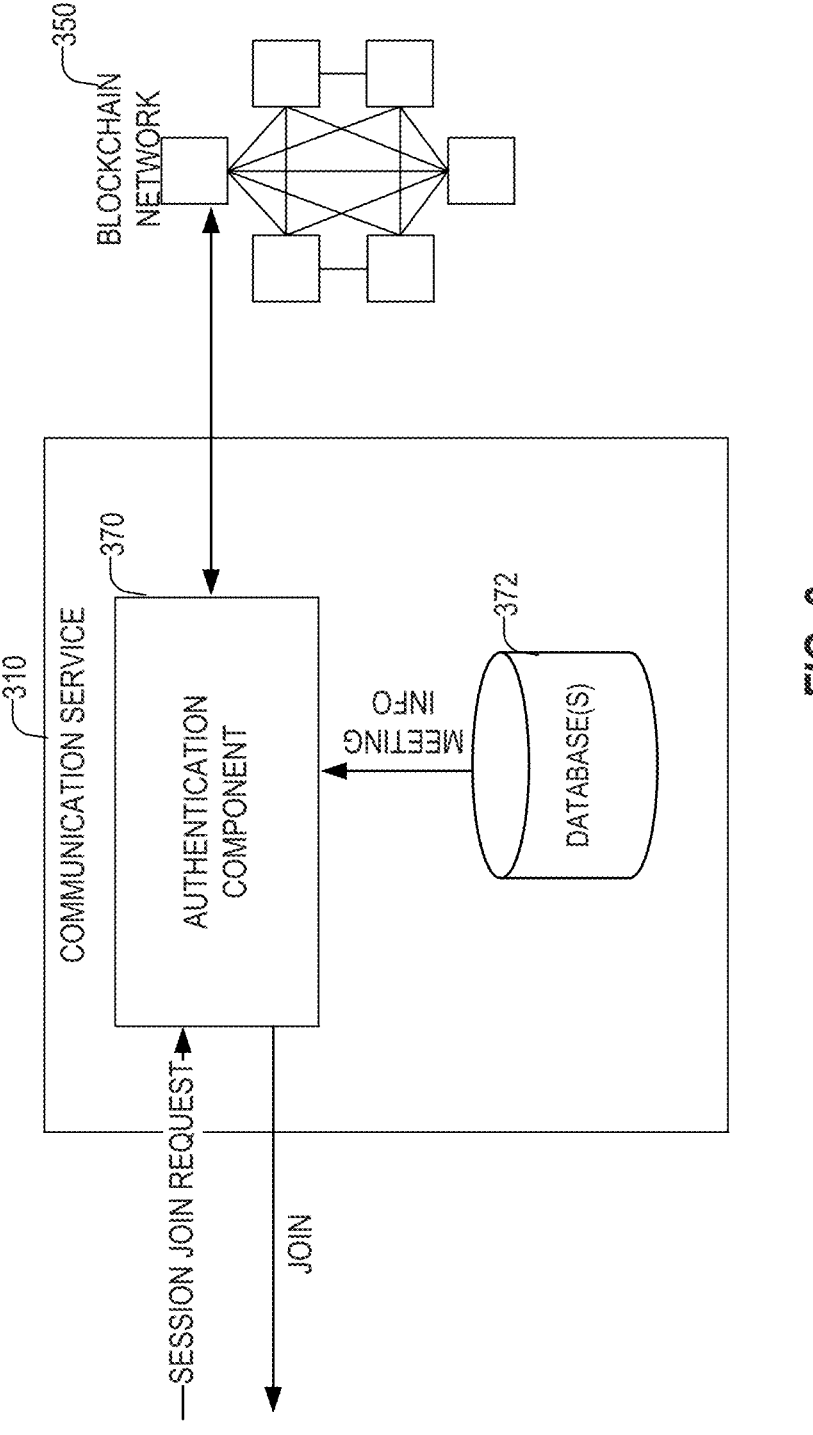
FIG. 3 illustrates a diagram of a communications service processing a meeting join request from a computing device using a token, according to some examples of the present disclosure.

FIG. 3 illustrates a diagram of a communications service 310 processing a meeting join request from a computing device using a token, according to some examples of the present disclosure. The communication service 310 may be an example of communication service 210 and 110 according to some examples. One of ordinary skill in the art with the benefit of the present disclosure will appreciate that communication service 310 may include other components not shown in FIG. 3 such as components used to exchange media during one or more communication sessions, setup one or more communication sessions or the like.

A device of a participant wishing to join the communication session may send a session join request to the communication service 310. The communication session join request is handled by an authentication component 370. The communication session join request may include or indicate a session identifier, a user identifier, and/or a token. The session identifier may be used to retrieve the communication session data structure from the database 372. The communication session data structure may specify one or more resources scheduled for the communication session and may identify the participants.

Authentication component may authenticate the received token from the session join request with tokens created for the session. These tokens may be retrieved from the blockchain 350, or may be retrieved from the communication session data structure in the database 372. In still other examples, the token may have a component that was encrypted by the communication service 310. By decrypting this portion and verifying the information within the decrypted portion (e.g., verifying that one or more decrypted fields match with one or more unencrypted fields or some other information), the communication service may identify the user. Once the user is identified and authenticated, one or more customizations may be applied. In addition, the user may be admitted to join the meeting without having to wait in a waiting room to be admitted by a different user.

Figure 4:
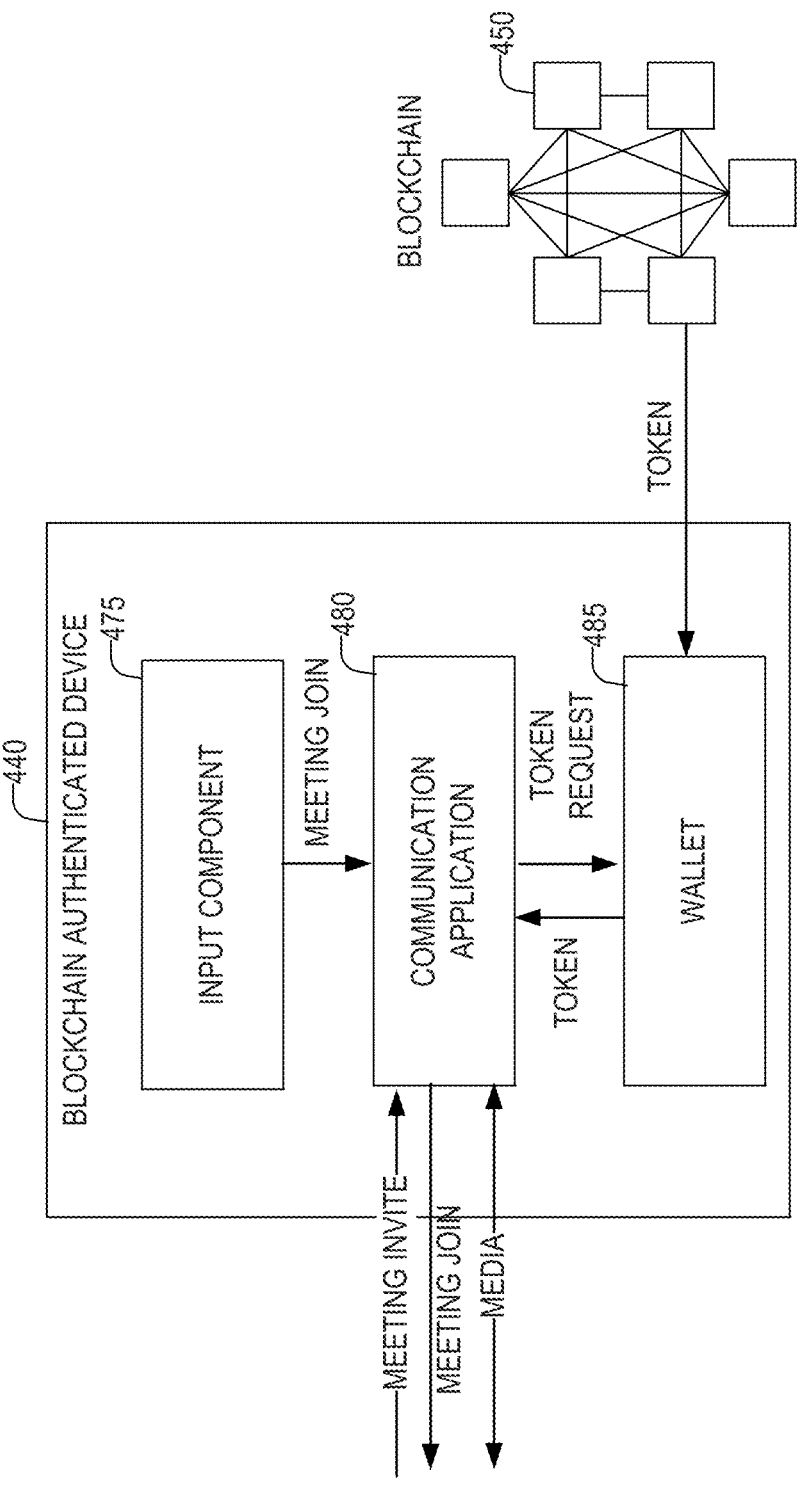
FIG. 4 illustrates a blockchain authenticated device according to some examples of the present disclosure.

FIG. 4 illustrates a blockchain authenticated device 440 according to some examples of the present disclosure. One of ordinary skill in the art with the benefit of the present disclosure will appreciate that blockchain authenticated device 440 may include other components not shown in FIG. 4. Blockchain authenticated device 440 may be one example of blockchain authenticated device 140 of claim 1. A meeting invite may be received by a communication application 480 and/or a different application. The meeting invite may include meeting information such as date, time, a meeting identifier, a password, and other authentication information.

In some examples, the meeting invite may include a token, or a notification that an authentication token is recorded on the blockchain for the blockchain authenticated device 440. In other examples, the presence of the meeting invite signals the blockchain authenticated device 440 to look for the authentication token on the blockchain network 450. In yet other examples, the blockchain network 450 (which may be an example of blockchain network 150, 250, and 350) notifies the blockchain authenticated device 440 of the presence of the token. In some examples, the meeting invite includes credentials for a newly created blockchain network account for the blockchain authenticated device 440.

In some examples, a wallet application 485 may manage one or more tokens associated with the blockchain. For example, the wallet application 485 may manage one or more keys that decrypt tokens from the blockchain. For example, tokens may be encrypted by a public key of the wallet application 485 and decrypted by a private key of the wallet application 485.

Upon receiving an input from a user to join the communication session (e.g., clicking a join link or button), the input component 475 may send a message to the communication application 480. For example, the input component 475 may be part of an operating system and the meeting join message may be an event indicating selection of one or more Graphical User Interface elements.

The communication application may then request the token from the wallet application 485. For example, the wallet application 485 may communicate with other applications using an Application Programming Interface (API). The token may then be acquired by the communication application. Communication application 480 may send the token to a communication service (such as communication service 110) as part of a join process (e.g., either in a meeting join request or a subsequent message prior to joining the session). Once the token is authenticated, the communication application 480 may be admitted to the communication session by the communication service and media may be received from the session and/or sent to the session.

In some examples, the blockchain authenticated device 440 may receive or may apply one or more customized communication session parameters responsive to authentication by the token. For example, the communication service may instruct the blockchain authenticated device 440 to apply one or more customized communication session parameters. In other examples, the blockchain authenticated device 440 may apply the customized communication session parameters. For example, the blockchain authenticated device 440 may determine that the token includes customized communication session parameters and may apply those parameters in response. In some examples, the blockchain authenticated device may not be placed in a meeting waiting room or be subject to additional authentication or verification.

FIG. 5 illustrates a flowchart of a method 500 of using a blockchain token to authenticate users of a communication session according to some examples of the present disclosure. At operation 510 the communication service may receive a request to schedule a communication session. The communication session may be an online meeting, a VoIP phone call, or the like. The request may include communication session parameters such as date, time, participants (and their identifiers), participant specific session parameters, and the like. Responsive to receiving this request, the system may determine that a participant identified in the request is not authenticated with an identity service. For example, the identifier of the participant is not associated with a trusted tenant.

At operation 520, for that participant, the system may identify an account on the public blockchain. The account may correspond to the identifier provided by the user. In other examples, the system may have a mapping between the identifiers and the public blockchain. In still other examples, the system may notify the participant and request the blockchain account identifier. In some examples, the communication service may create an account for the participant, for example, where the system is not able to determine an account for the participant on the blockchain. Where the communication service creates the account for the participant, the authentication information (e.g., private key) for the account may be provided to the participant in an invite sent to the participant.

At operation 530, the system may create an authentication token and at operation 540, the token may be recorded on the public blockchain. The token may be recorded as owned by the account identified at operation 520. For example, the system may record it as a transaction to one or more nodes of the blockchain for adding to the next block. The token may have participant information, meeting information, one or more parameters (e.g., it may have user specific communication session parameters). In some examples, one or more items in the token may be encrypted with the participant's blockchain account's private key. In some examples, one or more of the items in the token may be encrypted with the communication service's private key. As previously noted, in some examples, only the invitees that are not members of a trusted tenant may use tokens to authenticate, but in other examples, all invitees may have tokens created for them, and use those tokens to authenticate to the communication session.

The communication service may send one or more invite messages that may include communication session information and information useful (if necessary) for the computing device to identify that a token to join the meeting is required to join and is stored on the blockchain.

At operation 550, the communication service may receive a communication session join request including the authentication token. At operation 560, the communication service may confirm the token matches an expected token of a valid participant of the communication session. For example, the communication service may retrieve the communication session data structure and compare the token stored there for the participant to the received token. In other examples, the token may not be stored at the communication service, but instead the communication service may retrieve the token from the blockchain. In yet other examples, the communication service may decrypt a portion of the token signed by a public key of the communication service. The decrypted portion may include one or more indicia of authenticity, such as a secret value or other information (e.g., a session specific random value stored in the communication session data structure).

At operation 570, the system may, responsive to confirming the authenticity of the token, admit the computing device to the communication session. In some examples, the computing device may be admitted without having to first be placed in a waiting room or lobby. In some examples, the computing device may have one or more custom communication session parameters applied. The custom communication session parameters, in some examples, may be recorded as part of the communication session data structure, or may be included in the token (either in an unencrypted portion, a portion encrypted with the key of the participant, or a portion encrypted with the key of the communication service).

Figure 6:
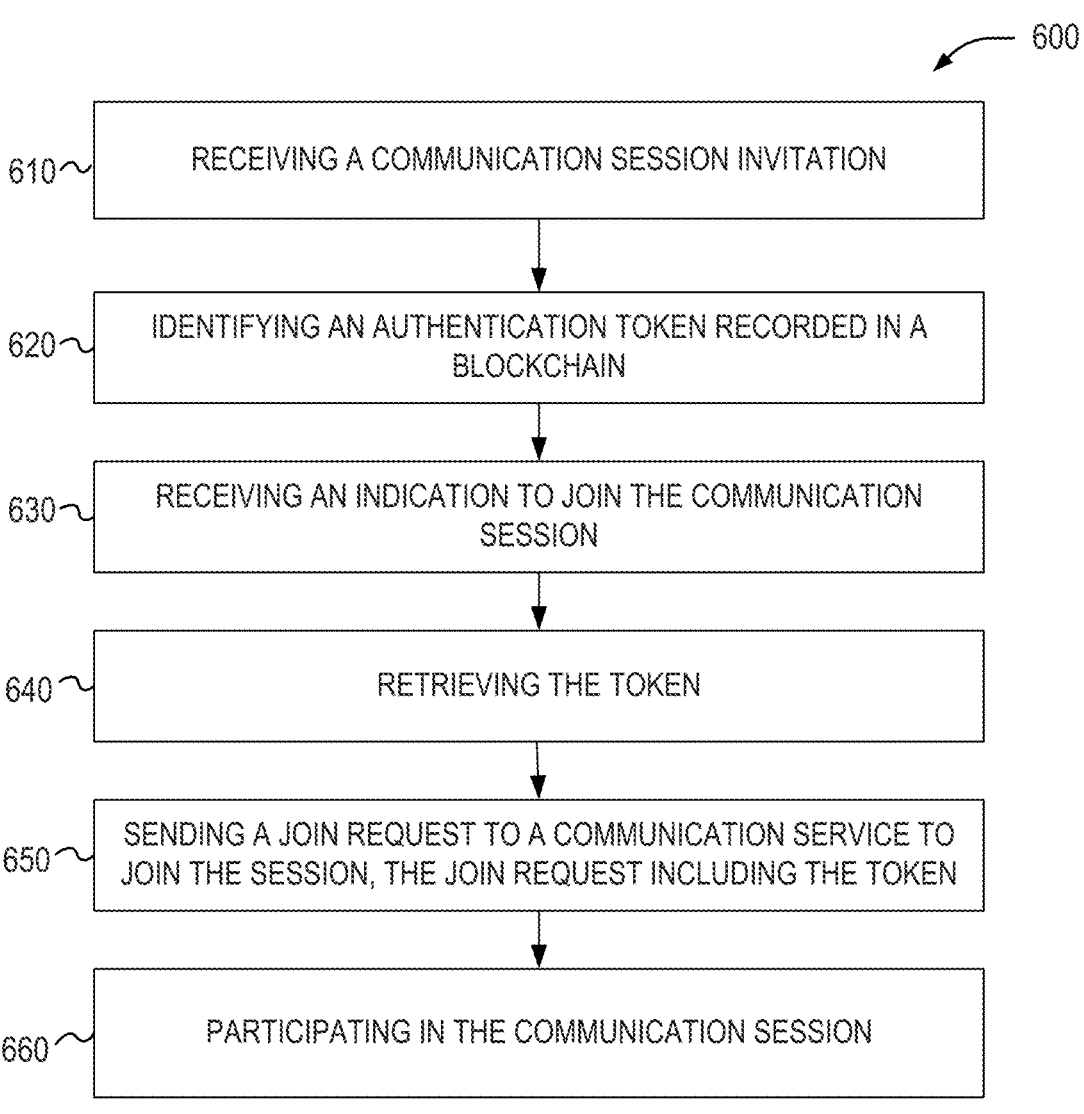
FIG. 6 illustrates a flowchart of a method of a computing device joining a meeting using a token on a blockchain according to some examples of the present disclosure.

FIG. 6 illustrates a flowchart of a method 600 of a computing device, such as blockchain authenticated device 140 of FIG. 1, joining a meeting using a token on a blockchain according to some examples of the present disclosure. At operation 610 the computing device receives a communication session invitation. The communication session invitation may include a token, an indication of the token on the blockchain, or the like. In some examples, the communication session invitation may include authentication credentials to a blockchain account created by the communication session for the computing device for those examples in which the communication service created an account for this participant.

At operation 620, the computing device may identify an authentication token recorded on a blockchain for a blockchain account of the computing device. For example, a wallet application may recognize, or be notified of a token. In other examples, the invitation message may notify the computing device of the presence of the token.

At operation 630, the computing device may receive an indication to join the communication session. For example, a user may provide input to the computing device to join the communication session. An example inputs may include clicking a join link. At operation 640, the system may retrieve the token. For example, by interfacing with a wallet application.

At operation 650, the device may send a join request to a communication service to join the session, the join request may include the token. This may allow the computing device to join the communication session. The device may join the session without being placed in a meeting lobby and may apply one or more communication session parameters. At operation 660 the device may participate in the communication session.

As previously described, in some examples, the communication session data structure may be stored on the blockchain as well. In these examples, the communication session data structure may be stored as a composable NFT as a parent token which then references all of the attendee tokens.

In addition, as previously described, the system may prevent transfers of the token. In these examples, the token may include a field, encrypted by a key of the communication service, the wallet account for which it was created. If someone not possessing that wallet account attempts to join the meeting with that token, the system may reject that attempt.

In some examples, transfers may be permitted. For example, an owner of a token may be permitted to "sign" for a transferee by creating their own token based upon the original token. The meeting service may allow this transferee to join the meeting-depending on the security policy of the communication service, the tenant, and/or meeting settings.

Figure 7:
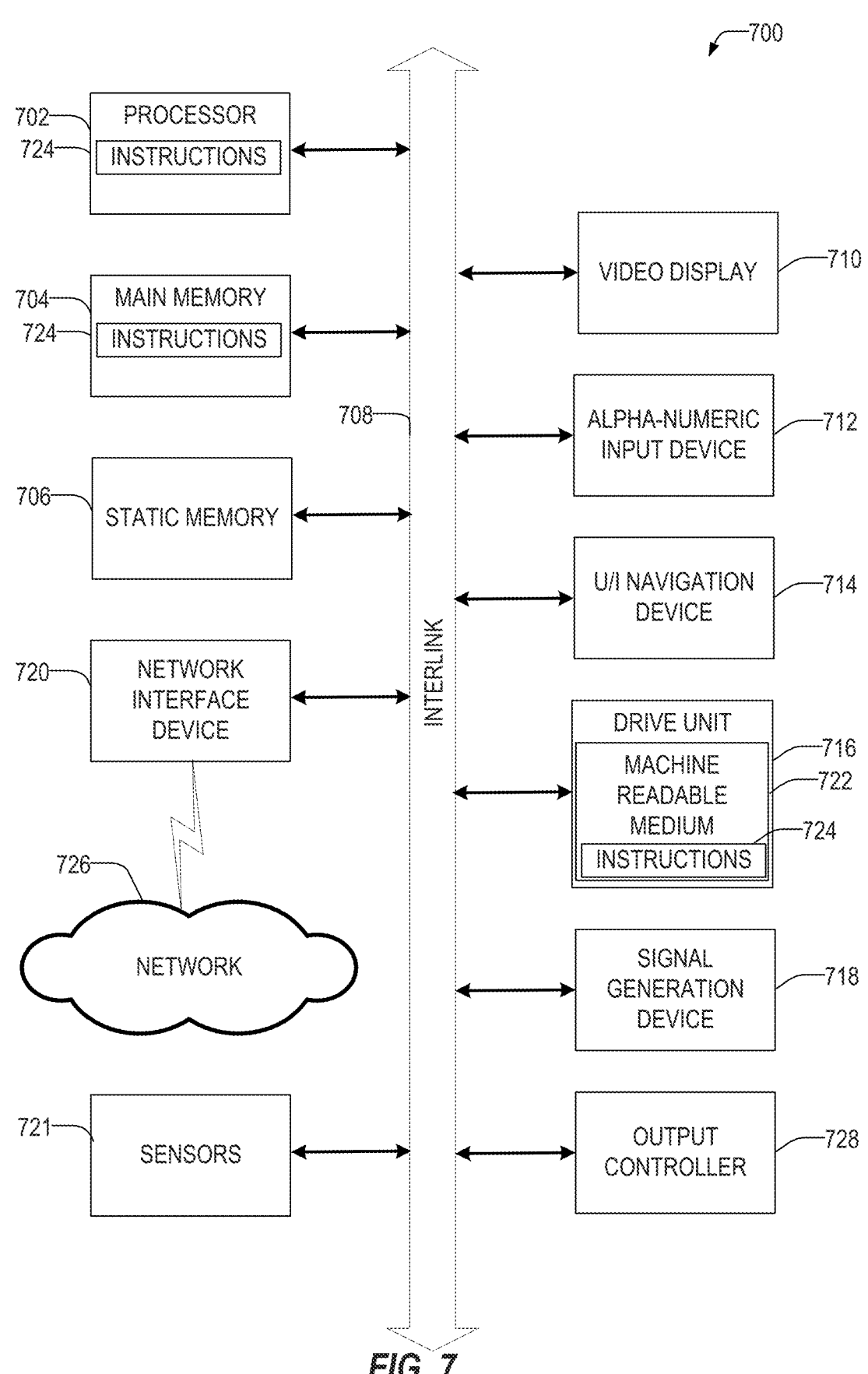
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a smart phone, a web appliance, a network router, switch or bridge, server, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. Machine 700 may be, or implement, any of the devices in FIGS. 1-4 and be configured to execute the methods of FIGS. 5 and 6.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 724 may further be transmitted or received over a communications network 726 using a transmission medium via the network interface device 720. The Machine 700 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. In some examples, the network interface device 720 may wirelessly communicate using Multiple User MIMO techniques.

Example 1 is a method for verifying an identity of a participant in a network-based communication session using a public blockchain, the method comprising: receiving a request to schedule a communication session, the request including an identifier of a participant invited to the communication session; identifying an account of the participant on the public blockchain based upon the identifier of the participant; creating an authentication token specific to the participant and an identifier of the communication session; recording the authentication token on the public blockchain, the authentication token associated on the public blockchain with the identifier of the blockchain account of the participant and the identifier of the communication session; receiving a communication session join request from a computing device requesting to join the communication session identified by the identifier of the communication session, the computing device providing the authentication token to join the communication session; confirming that the received authentication token matches the recorded authentication token recorded on the public blockchain; and responsive to determining that the received authentication token matches the recorded authentication token, admitting the computing device to the communication session as the participant.

In Example 2, the subject matter of Example 1 includes, wherein the authentication token is a non-fungible token.

In Example 3, the subject matter of Examples 1-2 includes, receiving a first setting for the participant of the network-based communication session; wherein responsive to confirming that the received authentication token matches the recorded authentication token, admitting the computing device to the communication session comprises: identifying that a first setting corresponds to the participant; and applying the first setting to the participant in the communication session and applying a second setting different from the first setting to a second participant in the communication session.

In Example 4, the subject matter of Examples 1-3 includes, wherein the communication session is a network-based meeting.

In Example 5, the subject matter of Examples 1-4 includes, wherein recording the authentication token on the public blockchain comprises recording the authentication token as a contract on the public blockchain.

In Example 6, the subject matter of Examples 1-5 includes, wherein recording the authentication token on the public blockchain comprises recording the authentication token as a smart contract on the public blockchain, the smart contract sending a notification to the participant.

In Example 7, the subject matter of Examples 1-6 includes, wherein the public blockchain is an Ethereum blockchain.

In Example 8, the subject matter of Examples 1-7 includes, wherein identifying an account of the participant on a public blockchain based upon the identifier of the participant comprises creating an account on the public blockchain for the participant, and wherein the method further comprises: providing a private key for the account and an account identifier to the participant.

In Example 9, the subject matter of Examples 1-8 includes, storing, with a data structure of communication session information, settings for the participant, the participant identified based upon the authentication token.

In Example 10, the subject matter of Examples 1-9 includes, sending the authentication token to the participant as part of an invitation to the network-based communication session.

Example 11 is a computing device for verifying an identity of a participant in a network-based communication session using a public blockchain, the device comprising: a processor; a memory, storing instructions, which when executed by the processor, cause the processor to perform operations comprising: receiving a request to schedule a communication session, the request including an identifier of a participant invited to the communication session; identifying an account of the participant on the public blockchain based upon the identifier of the participant; creating an authentication token specific to the participant and an identifier of the communication session; recording the authentication token on the public blockchain, the authentication token associated on the public blockchain with the identifier of the blockchain account of the participant and the identifier of the communication session; receiving a communication session join request from a second computing device requesting to join the communication session identified by the identifier of the communication session, the second computing device providing the authentication token to join the communication session; confirming that the received authentication token matches the recorded authentication token recorded on the public blockchain; and responsive to determining that the received authentication token matches the recorded authentication token, admitting the second computing device to the communication session as the participant.

In Example 12, the subject matter of Example 11 includes, wherein the authentication token is a non-fungible token.

In Example 13, the subject matter of Examples 11-12 includes, receiving a first setting for the participant of the network-based communication session; wherein responsive to confirming that the received authentication token matches the recorded authentication token, admitting the second computing device to the communication session comprises: identifying that a first setting corresponds to the participant; and applying the first setting to the participant in the communication session and applying a second setting different from the first setting to a second participant in the communication session.

In Example 14, the subject matter of Examples 11-13 includes, wherein the communication session is a network-based meeting.

In Example 15, the subject matter of Examples 11-14 includes, wherein the operations of recording the authentication token on the public blockchain comprises recording the authentication token as a contract on the public blockchain.

In Example 16, the subject matter of Examples 11-15 includes, wherein the operations of recording the authentication token on the public blockchain comprises recording the authentication token as a smart contract on the public blockchain, the smart contract sending a notification to the participant.

In Example 17, the subject matter of Examples 11-16 includes, wherein the public blockchain is an Ethereum blockchain.

In Example 18, the subject matter of Examples 11-17 includes, wherein the operations of identifying an account of the participant on a public blockchain based upon the identifier of the participant comprises creating an account on the public blockchain for the participant, and wherein the operations further comprises: providing a private key for the account and an account identifier to the participant.

In Example 19, the subject matter of Examples 11-18 includes, wherein the operations further comprise: storing, with a data structure of communication session information, settings for the participant, the participant identified based upon the authentication token.

In Example 20, the subject matter of Examples 11-19 includes, wherein the operations further comprise sending the authentication token to the participant as part of an invitation to the network-based communication session.

Example 21 is a non-transitory machine-readable medium for verifying an identity of a participant in a network-based communication session using a public blockchain, the machine-readable medium storing instructions, which when executed by a machine, cause the machine to perform operations comprising: receiving a request to schedule a communication session, the request including an identifier of a participant invited to the communication session; identifying an account of the participant on the public blockchain based upon the identifier of the participant; creating an authentication token specific to the participant and an identifier of the communication session; recording the authentication token on the public blockchain, the authentication token associated on the public blockchain with the identifier of the blockchain account of the participant and the identifier of the communication session; receiving a communication session join request from a computing device requesting to join the communication session identified by the identifier of the communication session, the computing device providing the authentication token to join the communication session; confirming that the received authentication token matches the recorded authentication token recorded on the public blockchain; and responsive to determining that the received authentication token matches the recorded authentication token, admitting the computing device to the communication session as the participant.

In Example 22, the subject matter of Example 21 includes, wherein the authentication token is a non-fungible token.

In Example 23, the subject matter of Examples 21-22 includes, receiving a first setting for the participant of the network-based communication session; wherein responsive to confirming that the received authentication token matches the recorded authentication token, admitting the computing device to the communication session comprises: identifying that a first setting corresponds to the participant; and applying the first setting to the participant in the communication session and applying a second setting different from the first setting to a second participant in the communication session.

In Example 24, the subject matter of Examples 21-23 includes, wherein the communication session is a network-based meeting.

In Example 25, the subject matter of Examples 21-24 includes, wherein the operations of recording the authentication token on the public blockchain comprises recording the authentication token as a contract on the public blockchain.

In Example 26, the subject matter of Examples 21-25 includes, wherein the operations of recording the authentication token on the public blockchain comprises recording the authentication token as a smart contract on the public blockchain, the smart contract sending a notification to the participant.

In Example 27, the subject matter of Examples 21-26 includes, wherein the public blockchain is an Ethereum blockchain.

In Example 28, the subject matter of Examples 21-27 includes, wherein the operations of identifying an account of the participant on a public blockchain based upon the identifier of the participant comprises creating an account on the public blockchain for the participant, and wherein the operations further comprises: providing a private key for the account and an account identifier to the participant.

In Example 29, the subject matter of Examples 21-28 includes, wherein the operations further comprise: storing, with a data structure of communication session information, settings for the participant, the participant identified based upon the authentication token.

In Example 30, the subject matter of Examples 21-29 includes, wherein the operations further comprise sending the authentication token to the participant as part of an invitation to the network-based communication session.

Example 31 is a computing device for verifying an identity of a participant in a network-based communication session using a public blockchain, the computing device comprising: means for receiving a request to schedule a communication session, the request including an identifier of a participant invited to the communication session; means for identifying an account of the participant on the public blockchain based upon the identifier of the participant; means for creating an authentication token specific to the participant and an identifier of the communication session; means for recording the authentication token on the public blockchain, the authentication token associated on the public blockchain with the identifier of the blockchain account of the participant and the identifier of the communication session; means for receiving a communication session join request from a second computing device requesting to join the communication session identified by the identifier of the communication session, the second computing device providing the authentication token to join the communication session; means for confirming that the received authentication token matches the recorded authentication token recorded on the public blockchain; and means for, responsive to determining that the received authentication token matches the recorded authentication token, admitting the second computing device to the communication session as the participant.

In Example 32, the subject matter of Example 31 includes, wherein the authentication token is a non-fungible token.

In Example 33, the subject matter of Examples 31-32 includes, means for receiving a first setting for the participant of the network-based communication session; means for, wherein responsive to confirming that the received authentication token matches the recorded authentication token, admitting the second computing device to the communication session comprises: means for identifying that a first setting corresponds to the participant; and means for applying the first setting to the participant in the communication session and applying a second setting different from the first setting to a second participant in the communication session.

In Example 34, the subject matter of Examples 31-33 includes, wherein the communication session is a network-based meeting.

In Example 35, the subject matter of Examples 31-34 includes, wherein the means for recording the authentication token on the public blockchain comprises means for recording the authentication token as a contract on the public blockchain.

In Example 36, the subject matter of Examples 31-35 includes, wherein the means for recording the authentication token on the public blockchain comprises means for recording the authentication token as a smart contract on the public blockchain, the smart contract sending a notification to the participant.

In Example 37, the subject matter of Examples 31-36 includes, wherein the public blockchain is an Ethereum blockchain.

In Example 38, the subject matter of Examples 31-37 includes, wherein the means for identifying an account of the participant on a public blockchain based upon the identifier of the participant comprises means for creating an account on the public blockchain for the participant, and wherein the computing device further comprises: means for providing a private key for the account and an account identifier to the participant.

In Example 39, the subject matter of Examples 31-38 includes, means for storing, with a data structure of communication session information, settings for the participant, the participant identified based upon the authentication token.

In Example 40, the subject matter of Examples 31-39 includes, means for sending the authentication token to the participant as part of an invitation to the network-based communication session.

Example 41 is at least one machine-readable medium including instructions that, when executed by processing circuitry, cause the processing circuitry to perform operations to implement of any of Examples 1-40.

Example 42 is an apparatus comprising means to implement of any of Examples 1-40.

Example 43 is a system to implement of any of Examples 1-40. Example 44 is a method to implement of any of Examples 1-40.

What is claimed is:

1. A method for authenticating to a network-based communication service to participate in a network-based communication session, the method comprising:

at a computing device, performing operations comprising:

receiving an invitation to a communication session, the invitation including an indication of an authentication token recorded on a public blockchain, the authentication token associated on the public blockchain with an identifier of a blockchain account of a participant;

receiving an input to join the network-based communication session;

responsive to receiving the input to join the network-based communication session:

retrieving the authentication token using credentials of the blockchain account of the participant;

sending a join request to the network-based communication service to join the network-based communication session, the join request providing the authentication token to authenticate with the network-based communication service; and responsive to the network-based communication service authenticating the authentication token, joining the network-based communication session.

2. The method of claim 1, wherein the authentication token includes a custom communication setting, and wherein joining the network-based communication session comprises applying the custom communication setting to the network-based communication session.

3. The method of claim 1, wherein the authentication token includes an indicator of whether a transfer is allowed.

4. The method of claim 3, further comprising:

receiving a user input to transfer the authentication token; and determining that the indicator of whether the transfer is allowed indicates a transfer is not allowed, and in response, denying the transfer of the authentication token.

5. The method of claim 1, wherein the authentication token comprises two or more of: an identifier of the participant provided by a communication session organizer; identifier of the network-based communication session; or a random sequence.

6. The method of claim 1, wherein at least a portion of the authentication token is encrypted by a public key of the blockchain account and wherein the method comprises decrypting the at least a portion of the authentication token using a private key of the blockchain account.

7. The method of claim 1, further comprises:
providing an identifier of the blockchain account of the participant to the network-based communication service.

8. A machine-readable medium, storing instructions for authenticating to a network-based communication service to participate in a network-based communication session, the instructions, which when executed, cause a machine to perform operations comprising:
receiving an invitation to a communication session, the invitation including an indication of an authentication token recorded on a public blockchain, the authentication token associated on the public blockchain with an identifier of a blockchain account of a participant;
receiving an input to join the network-based communication session;
responsive to receiving the input to join the network-based communication session:
retrieving the authentication token using credentials of the blockchain account of the participant;
sending a join request to the network-based communication service to join the network-based communication session, the join request providing the authentication token to authenticate with the network-based communication service; and
responsive to the network-based communication service authenticating the authentication token, joining the network-based communication session.

9. The machine-readable medium of claim 8, wherein the authentication token includes a custom communication setting, and wherein joining the network-based communication session comprises applying the custom communication setting to the network-based communication session.

10. The machine-readable medium of claim 8, wherein the authentication token includes an indicator of whether a transfer is allowed.

11. The machine-readable medium of claim 10, wherein the operations further comprise:
receiving a user input to transfer the authentication token; and
determining that the indicator of whether the transfer is allowed indicates a transfer is not allowed, and in response, denying the transfer of the authentication token.

12. The machine-readable medium of claim 8, wherein the authentication token comprises two or more of: an identifier of the participant provided by a communication session organizer; identifier of the network-based communication session; or a random sequence.

13. The machine-readable medium of claim 8, wherein at least a portion of the authentication token is encrypted by a public key of the blockchain account and wherein the operations comprise decrypting the at least a portion of the authentication token using a private key of the blockchain account.

14. The machine-readable medium of claim 8, wherein the operations further comprise:
providing an identifier of the blockchain account of the participant to the network-based communication service.

15. A computing device for authenticating to a network-based communication service to participate in a network-based communication session, the computing device comprising:
a hardware processor;
a memory, the memory storing instructions, which when executed by the hardware processor cause the computing device to perform operations comprising:
receiving an invitation to a communication session, the invitation including an indication of an authentication token recorded on a public blockchain, the authentication token associated on the public blockchain with an identifier of a blockchain account of a participant;
receiving an input to join the network-based communication session;
responsive to receiving the input to join the network-based communication session:
retrieving the authentication token using credentials of the blockchain account of the participant;
sending a join request to the network-based communication service to join the network-based communication session, the join request providing the authentication token to authenticate with the network-based communication service; and
responsive to the network-based communication service authenticating the authentication token, joining the network-based communication session.

16. The computing device of claim 15, wherein the authentication token includes a custom communication setting, and wherein joining the network-based communication session comprises applying the custom communication setting to the network-based communication session.

17. The computing device of claim 15, wherein the authentication token includes an indicator of whether a transfer is allowed.

18. The computing device of claim 17, wherein the operations further comprise:
receiving a user input to transfer the authentication token; and
determining that the indicator of whether the transfer is allowed indicates a transfer is not allowed, and in response, denying the transfer of the authentication token.

19. The computing device of claim 15, wherein the authentication token comprises two or more of: an identifier of the participant provided by a communication session organizer; identifier of the network-based communication session; or a random sequence.

20. The computing device of claim 15, wherein at least a portion of the authentication token is encrypted by a public key of the blockchain account and wherein the operations comprise decrypting the at least a portion of the authentication token using a private key of the blockchain account.

* * * * *